United States Patent
Kowalchuk et al.

(10) Patent No.: US 9,591,800 B2
(45) Date of Patent: Mar. 14, 2017

(54) AGRICULTURAL IMPLEMENT METERING SYSTEM AND METHOD

(71) Applicant: CNH Industrial Canada, Ltd., Saskatoon (CA)

(72) Inventors: Trevor Lawrence Kowalchuk, Saskatoon (CA); Gordon Anthony Engel, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 2 days.

(21) Appl. No.: 14/547,903

(22) Filed: Nov. 19, 2014

(65) Prior Publication Data

US 2016/0135359 A1    May 19, 2016

(51) Int. Cl.
| | |
|---|---|
| *A01C 7/20* | (2006.01) |
| *A01C 7/06* | (2006.01) |
| *A01C 21/00* | (2006.01) |
| *A01C 7/10* | (2006.01) |
| A01C 7/08 | (2006.01) |

(52) U.S. Cl.
CPC .............. *A01C 21/00* (2013.01); *A01C 7/102* (2013.01); *A01C 7/105* (2013.01); A01C 7/081 (2013.01)

(58) Field of Classification Search
CPC ......... A01C 7/082; A01C 7/084; A01C 7/105; A01C 7/042; A01C 7/04
USPC ................................................ 111/174–178
See application file for complete search history.

(56) References Cited

U.S. PATENT DOCUMENTS

| | | | |
|---|---|---|---|
| 4,280,419 A * | 7/1981 | Fischer | A01C 15/04 111/174 |
| 5,161,473 A | 11/1992 | Landphair et al. | |
| 5,632,212 A | 5/1997 | Barry | |
| 5,740,746 A | 4/1998 | Ledermann et al. | |
| 5,979,343 A * | 11/1999 | Gregor | A01C 7/081 111/175 |
| 6,047,652 A | 4/2000 | Prairie et al. | |
| 6,505,569 B1 * | 1/2003 | Richard | A01C 7/042 111/174 |
| 6,595,148 B2 | 7/2003 | Meyer et al. | |
| 6,644,225 B2 * | 11/2003 | Keaton | A01C 7/042 111/175 |
| 6,668,738 B2 | 12/2003 | Lee et al. | |
| 6,718,891 B1 | 4/2004 | Burbage et al. | |
| 6,935,255 B2 * | 8/2005 | Hagen | A01C 15/006 111/174 |
| 7,374,029 B1 | 5/2008 | Dillman | |

(Continued)

*Primary Examiner* — John G Weiss

(74) *Attorney, Agent, or Firm* — Rebecca L. Henkel; Rickard K. DeMille

(57) ABSTRACT

One embodiment describes an agricultural implement. The agricultural implement includes a plurality of ground engaging opener assemblies that each excavates a trench into soil and deposits a granular product into the trench as the agricultural implement is towed though a field; and a first tool meter coupled to the agricultural implement and pneumatically coupled to a first portion of the plurality of ground engaging opener assemblies. The first tool meter instructs a pneumatic distribution system to supply the granular product to the first tool meter based at least in part on a first amount of granular product stored in the first tool meter; and pneumatically distributes the granular product to the first portion of the plurality of ground engaging opener assemblies.

4 Claims, 5 Drawing Sheets

(56) References Cited

U.S. PATENT DOCUMENTS

| | | | |
|---|---|---|---|
| 7,571,688 B1 | 8/2009 | Friestad et al. | |
| 7,743,719 B2 * | 6/2010 | Memory | A01C 7/088 |
| | | | 111/175 |
| 7,779,770 B2 | 8/2010 | Sauder et al. | |
| 7,866,269 B2 * | 1/2011 | Naylor | A01C 7/081 |
| | | | 111/176 |
| 7,938,072 B2 * | 5/2011 | Wilhelmi | A01C 7/081 |
| | | | 111/174 |
| 8,001,915 B2 * | 8/2011 | Friggstad | A01C 7/088 |
| | | | 111/178 |
| 8,186,288 B2 | 5/2012 | Chinkiwsky | |
| 8,234,988 B2 | 8/2012 | Zielke et al. | |
| 8,307,771 B2 | 11/2012 | Cannon et al. | |
| 8,375,874 B2 | 2/2013 | Peterson et al. | |
| 8,666,608 B2 * | 3/2014 | Friggstad | A01B 79/005 |
| | | | 111/173 |
| 8,893,630 B2 * | 11/2014 | Kowalchuk | A01C 7/102 |
| | | | 111/174 |
| 9,113,591 B2 * | 8/2015 | Shivak | A01C 7/04 |
| 2006/0243179 A1 * | 11/2006 | Landphair | A01C 15/006 |
| | | | 111/174 |
| 2008/0295751 A1 | 12/2008 | Shoup et al. | |
| 2010/0017073 A1 | 1/2010 | Landphair | |
| 2012/0266795 A1 | 10/2012 | Silbernagel et al. | |
| 2012/0298024 A1 | 11/2012 | Naylor | |
| 2013/0192503 A1 * | 8/2013 | Henry | A01C 7/082 |
| | | | 111/174 |
| 2014/0261116 A1 * | 9/2014 | Redman | A01C 7/20 |
| | | | 111/174 |
| 2016/0037713 A1 * | 2/2016 | Wendte | A01C 7/10 |
| | | | 111/177 |

* cited by examiner

AGRICULTURAL IMPLEMENT METERING SYSTEM AND METHOD

BACKGROUND

The present disclosure relates generally to agricultural implements and, more particularly, to metering a granular product to ground engaging opener assemblies on agricultural implements.

Generally, agricultural implements are towed behind an off-road work vehicle, such as a tractor. These agricultural implements typically include multiple rows of ground engaging opener assemblies to excavate trenches into soil for depositing a granular product, such as seeds or fertilizer. In this manner, rows of the granular product may be deposited into the soil. More specifically, the granular product may be stored in a central location, such as an air cart, and distributed to each of the ground engaging opener assemblies for deposition into the soil. Accordingly, the depositing of granular product (e.g., spacing and amount) into the soil may be managed by controlling the distribution of product to each of the ground engaging opener assemblies (e.g., via a metering device in the air cart).

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes an agricultural implement. The agricultural implement includes a plurality of ground engaging opener assemblies that each excavates a trench into soil and deposits a granular product into the trench as the agricultural implement is towed though a field; and a first tool meter coupled to the agricultural implement and pneumatically coupled to a first portion of the plurality of ground engaging opener assemblies. The first tool meter instructs a pneumatic distribution system to supply the granular product to the first tool meter based at least in part on a first amount of granular product stored in the first tool meter; and pneumatically distributes the granular product to the first portion of the plurality of ground engaging opener assemblies.

A second embodiment describes a method for depositing rows of a granular product into soil using an agricultural implement that includes instructing, using a control unit, a pneumatic distribution system to selectively distribute the granular product to a first tool meter and to a second tool meter on the agricultural implement, in which the first tool meter controls deposition of the granular product into a first plurality of rows and the second tool meter controls deposition of the granular product into second plurality of rows. The method additionally includes determining, using the control unit, whether it is desirable to deposit the granular product in the second plurality of rows, the first plurality of rows, or both; enabling or disabling, using the control unit, the first tool meter to control distribution of the granular product to a first plurality of ground engaging opener assemblies that deposit the granular product in the first plurality of rows based on whether is desirable to deposit the granular product in the first plurality of rows; and enabling or disabling, using the control unit, the second tool meter to control distribution of the granular product to a second plurality of ground engaging opener assemblies that deposit the granular product in the second plurality of rows based on whether is desirable to deposit the granular product in the second plurality of rows.

A third embodiment describes a tool meter mounted to an agricultural implement that includes a plurality of hose connectors, in which each of the plurality of hose connectors is pneumatically coupled (or gravity feed to the opener via a hose) to a respective ground engaging opener assembly on the agricultural implement via a hose; a hopper that receives a first air stream from a pneumatic distribution system and stores a granular product entrained in the first air stream; and a metering component that controls flow of the granular product from the hopper into a second air stream, in which the second air stream is output through the plurality of hose connectors toward the ground engaging opener assemblies.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
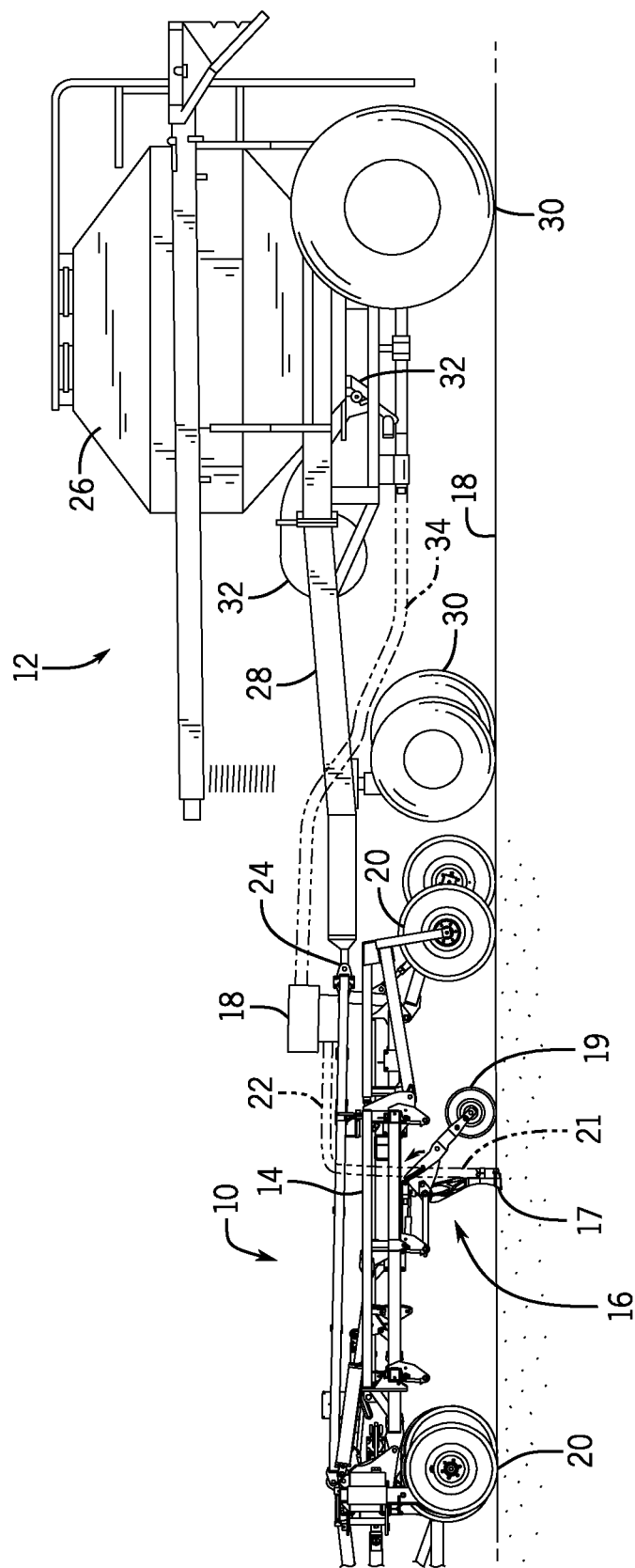
FIG. 1 is a side view of an agricultural implement with an air cart, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain agricultural implements may distribute a granular product (e.g., seeds or fertilizer) from a centralized location to multiple rows of ground engaging opener assemblies. Additionally, each of the ground engaging opener assemblies may engage the ground to excavate a trench, in which the received granular product is deposited. In this manner, rows of the granular product may be deposited into the ground. The granular product may be any suitable particulate material that is desired to be deposited into the ground, such as various types of seeds and fertilizers. However, to simplify the following discussion, the product will be described as seeds. Nevertheless, one or ordinary skill in the art would recognize that the techniques described herein may be easily adapted for use with other products.

Generally, each of the ground engaging opener assemblies may not include adjustable control over the deposition of seeds. Instead, a ground engaging opener assembly may pneumatically receive seeds via a pneumatic hose (or gravity feed via a hose). The ground engaging opener assembly may then utilize gravity to drop received seeds into a trench. In other words, the ground engaging opener assembly may deposit seeds based on fixed parameters, such as the size of the hose and/or the flow rate of seeds to the ground engaging opener assembly, amount other factors.

As such, the deposition of seeds into the ground may be managed by controlling the distribution of seeds to each of the ground engaging opener assemblies. In some embodiments, controlling the flow of seeds may enable the spacing and/or amount of seeds deposited to be controlled. For example, by decreasing the distribution rate of seeds to a ground engaging opener, the spacing between seeds may be increased and/or the amount of seeds deposited may be reduced. On the other hand, by increasing the distribution rate of seeds to a ground engaging opener, the spacing between seeds may be reduced and/or the amount of seeds deposited may be increased.

Generally, the seeds may be stored in a centralized location, such as an air cart, before being distributed to each of the ground engaging opener assemblies. Accordingly, it may be possible to control (e.g., meter) the seed distribution from the centralized location. However, centrally controlling distribution of seeds may make it difficult to compensate for the varying distribution tendencies between the ground engaging opener assemblies. For example, since the seeds may be distributed pneumatically, the ground engaging opener assemblies at the center of the agricultural implement may tend to receive a larger number of seeds compared to the ground engaging opener assemblies at the sides of the agricultural implement, which may lead to uneven distribution of seeds between the rows. These distribution tendencies may also be affected by the type of seed. For example, a larger central bias may be experienced when heavier seeds are used.

Additionally, it may be desirable to deposit seeds using only a portion of the ground engaging units. For example, due to a generally fixed size of the agricultural implement, a portion of the ground under the agricultural implement may have been previously seeded or may be otherwise undesirable to seed. In such instances, it may be desirable to enable sectional control across the agricultural implement by enabling a portion of the ground engaging opener assemblies to deposit seeds while disabling a portion of the ground engaging opener assemblies. However, centrally controlling distribution of seeds may make it difficult to implement sectional control since seeds are distributed to each of the ground engaging opener assemblies.

Accordingly, as will be described in more detail below, techniques described herein may improve the control over deposition of a granular product (e.g., seeds) into the ground by an agricultural implement. For example, one embodiment describes an agricultural system that includes an air cart and an agricultural implement, which includes a plurality of tool meters and ground engaging opener assemblies. More specifically, the air cart may centrally store the seeds and pneumatically distribute the seeds to the tool meters on the agricultural implement in an on-demand manner. In other words, each tool meter may control the amount of seeds received and stored, for example, based on the amount of seeds already held in the tool meter. Each tool meter may then control pneumatic seed distribution to a portion of the ground engaging opener assemblies, thereby controlling deposition of seeds (e.g., spacing and/or amount) by the portion of ground engaging opener assemblies.

In this manner, control over the agricultural implement may be improved by using multiple tool meters to account for varying desired operational conditions between the ground engaging opener assemblies. More specifically, since a tool meter may be located in close proximity to the ground engaging opener assemblies and may supply seeds to only a portion of the ground engaging opener assemblies, operational variations that affect distribution may be quickly and accurately addressed. For example, the distribution rate of seeds to the ground engaging opener assemblies quickly adjusted since the tool meter is located in closer proximity to the ground engaging opener assemblies. As such, the uniformity of seed distribution to the ground engaging opener assemblies supplied by a tool meter may be improved, which may thus improve uniformity of product deposition across the various rows.

Additionally, operational flexibility of the agricultural implement may be improved by using multiple tool meters to enable sectional control of the ground engaging assemblies. More specifically, since each tool meter distributes seeds to only a portion of the ground engaging opener assemblies, operation of groups of the ground engaging opener assemblies may be separately controlled. For example, when a first tool meter distributes seeds to a first and a second ground engaging opener assemblies, and a second tool meter distributes seeds to a third and a fourth ground engaging opener assemblies, the first tool meter may disable the first and the second ground engaging opener assemblies by stopping seed distribution while the second tool meter enables the third and the fourth ground engaging opener assemblies by continuing seed distribution.

To help illustrate, a side view of an agricultural implement 10 coupled to an air cart 12 is shown in FIG. 1. As depicted, the agricultural implement 10 includes a tool frame 14 coupled to a ground engaging opener assembly 16, a tool meter 18, and wheel assemblies 20.

As described above, the agricultural implement may be pulled by an off-road work vehicle (e.g., a tractor) to deposit rows of product. Accordingly, the wheel assemblies 20 may contact the soil surface to enable the agricultural implement 10 to be pulled by the off-road work vehicle. As the agricultural implement 10 is pulled, a row of product may be deposited into the soil by the ground engaging opener assembly 16. Although only one ground engaging opener assembly 16 is shown, the agricultural implement 10 may include multiple ground engaging opener assemblies 16 organized in one or more rows across the agricultural implement 10. In some embodiments, the agricultural implement 10 may include a row of 12, 14, 16, 18, 20, or more ground engaging opener assemblies 16, which may each deposit a row of seeds.

To facilitate depositing seeds, each ground engaging opener assembly 16 includes an opener 17, a press wheel 19, and a seed tube 21. More specifically, when the opener 17 engages the soil, the opener 17 may exert a downward force that excavates a trench into the soil as the ground engaging opener assembly 16 travels through the field. In some embodiments, the opener 17 may be shank type opener or a disk style opener. Seeds may then be deposited into the excavated trench via the seed tube 21. Then, the press wheel 19 may move the excavated soil into the trench to cover the seeds. In other embodiments, a gang of press wheels may be used to packs each row of the seed trenches.

As described above, the deposition of seeds by the ground engaging opener assembly 16 may be controlled by the distribution of seeds from the tool meter 18. In some embodiments, the tool meter 18 may pneumatically distribute the seeds to the ground engaging opener assembly 16 via a hose 22. Via gravity, the seeds may be dropped from the hose 22, though the seed tube 21, and into the trench. In other embodiments, since the tool meter 18 may be positioned closer to the ground engaging opener assembly 16, it may be possible to distribute the seeds from the tool meter 18 to the ground engaging opener assembly 16 via a gravity drop. More specifically, the tool meter 18 may be placed vertically above the ground engaging opener assembly 16. As such, gravity may pull seeds from the tool meter 18, through the hose 22, through the seed tube 21, and into the trench.

In other words, the tool meter 18 may control seed deposition by the ground engaging opener assembly 16 by controlling the rate at which seeds are supplied to the ground engaging opener assembly 16. Additionally, each tool meter 18 may supply seeds to multiple ground engaging opener assemblies 16. As such, the tool meter 18 may control the deposition of seeds in multiple rows. Furthermore, since the agricultural implement 10 may include multiple tool meters 18, this may enable sectional control over the deposition of seeds.

In the depicted embodiment, the air cart 12 is towed behind the agricultural implement 10. More specifically, the agricultural implement 10 may be coupled to the off-road work vehicle by a first hitch assembly (not shown), and the air cart 12 may be coupled to the agricultural implement 10 by a second hitch assembly 24. However, in other embodiments, the agricultural implement 10 may be towed behind the air cart 12. In further embodiments, the implement 10 and the air cart 12 may be part of a single unit that is towed behind an off-road work vehicle or may be elements of a self-propelled vehicle.

As described above, the air cart 12 may centrally store seeds and distribute the seeds to the tool meters 18. Accordingly, as depicted, the air cart 12 includes a storage tank 26, a frame 28, wheels 30, and an air source 32. More specifically, the towing hitch 24 is coupled between the tool frame 14 and the air cart frame 28, which enables the air cart 12 to be towed with the agricultural implement 10.

Additionally, the storage tank 26 may centrally store the product. In some embodiments, the storage tank 26 may include multiple compartments for storing different types of product. For example, a first compartment may store seeds while a second compartment may store a dry fertilizer. In such configurations, the air cart 12 may deliver both seed and fertilizer to the implement 10 via separate distribution systems, or as a mixture through a single distribution system.

Figure 2:
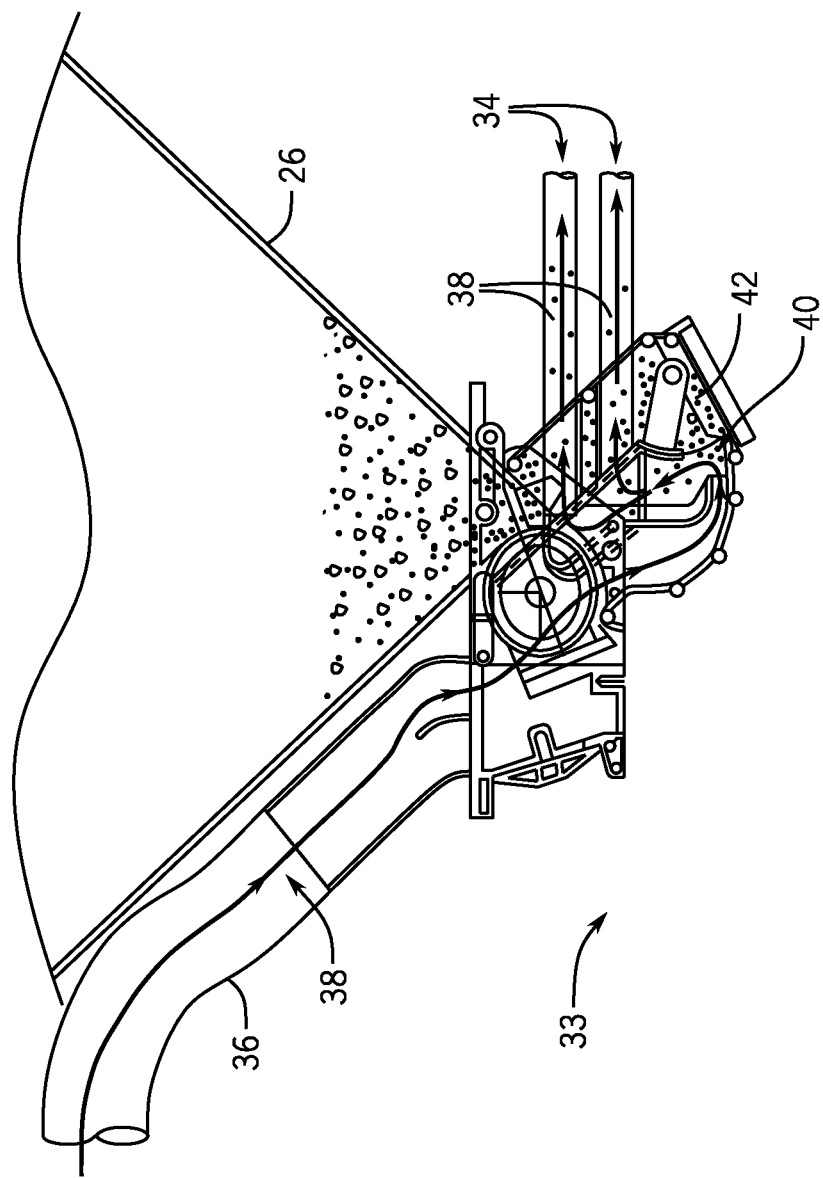
FIG. 2 is a cross sectional view of a portion of the air cart of FIG. 1, in accordance with an embodiment.

From the storage tank 26, the product (e.g., seeds) may be fed into a pneumatic distribution system 33, which pneumatically distributes the seeds to the tool meters 18 via respective hoses 34. To help illustrate, a more detailed view of the pneumatic distribution system 33 is shown in FIG. 2. As depicted, the pneumatic distribution system 33 is mounted to the bottom of the storage tank 26. To facilitate distributing seeds, an air stream generated by the air source 32 is guided though the pneumatic distribution system 33 via a hose 36. In some embodiments, the air source 32 may be a pump or blower powered by an electric or hydraulic motor, for example.

More specifically, the air stream 38 is guided into a nozzle region 40 so that the air stream 38 tangentially engages seeds 42 exiting from the bottom of the storage tank 26. In this manner, the seeds 42 may be entrained in the air stream 38. The air stream 38 may then be split into multiple hoses 34 for delivery to the tool meters 18. In some embodiments, each hose 34 may supply seeds to a single tool meter 18. As such, individual seed 42 may be suspended in the air stream 38 until being delivered to one of the tool meters 18 via a hose 34.

Figure 3:
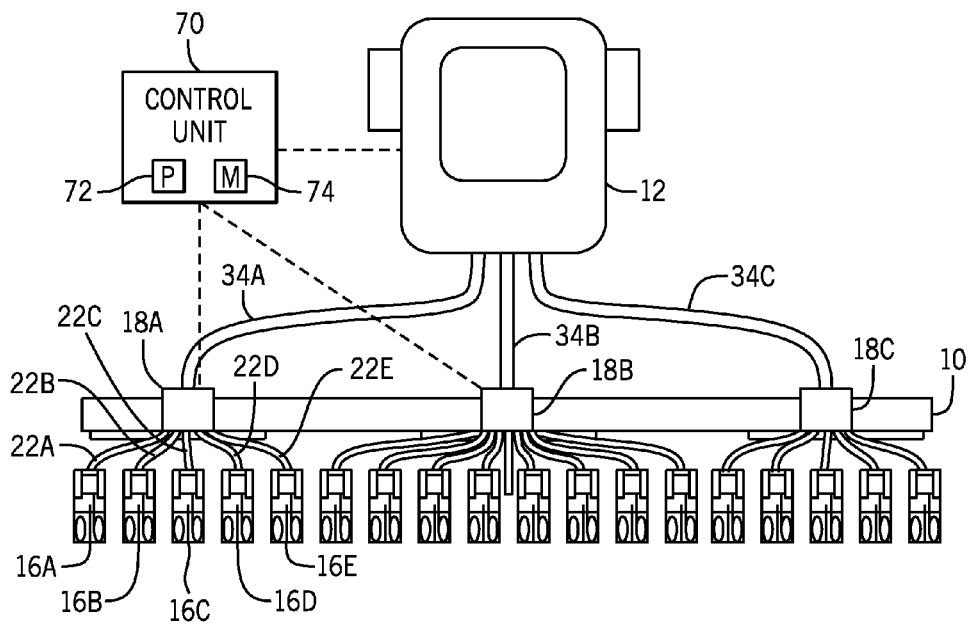
FIG. 3 is a schematic top view of the agricultural implement of FIG. 1 with multiple tool meters and the air car of FIG. 1, in accordance with an embodiment.

To help illustrate, a top view of the air cart 12 and the agricultural implement 10 are shown in FIG. 3. In the depicted embodiment, the agricultural implement 10 includes three tool meters 18A, 18B, and 18C, and eighteen ground engaging opener assemblies 16. It is noted that FIG. 3 merely illustrates one embodiment of an agricultural implement 10. In other embodiments, the agricultural implement 10 may include two or more tool meters 18 that distribute seeds to two or more (e.g., four) ground engaging opener assemblies 16. In other words, the operation of the agricultural implement 10 described with reference to FIG. 3 is merely to illustrate techniques that may be expanded to other embodiments.

In the depicted embodiment, the first tool meter 18A may receive seeds 42 from the air cart 12 via a first hose 34A, the second tool meter 18B may receive seeds 42 from the air cart 12 via a second hose 34B, and the third tool meter 18C may receive seeds 42 from the air cart 12 via a third hose 34C. As such, the splitting of the air stream 38 between the first hose 34A, the second hose 34B, and the third hose 34C may determine the amount of seeds delivered to the first tool meter 18A, the second tool meter 18B, and the third tool meter 18C, respectively.

In some embodiments, the air car 12 may exert little if any control over the splitting of the air stream 38. Instead, each of the tool meters 18 may control how the air stream 38 is split between the various hoses 34, and thus the delivery of seeds to the tool meters 18. In other words, the seeds 42 may be supplied to each tool meter 18 in an on-demand manner without metering at the air cart 12.

Figure 4:
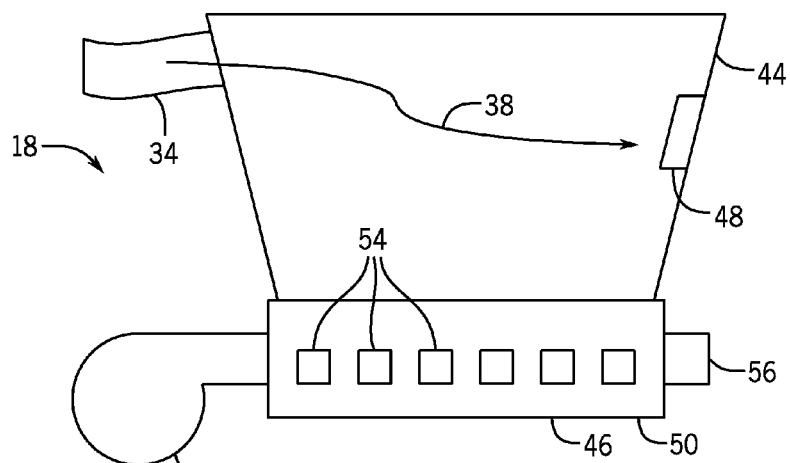
FIG. 4 is a schematic side view of a tool meter of FIG. 3, in accordance with an embodiment.

To help illustrate, a more detailed view of a tool meter 18 is shown in FIG. 4. As depicted, the tool meter 18A includes a hopper 44 and a metering component 46. As described above, the air stream 38 may flow into the tool meter 18 via a hose 34. More specifically, when the air stream 38 exits the hose 34 into the hopper 44, the velocity of the air stream 38 may decrease since the flow area increases (e.g., the flow area of the hopper 44 is greater than the flow area of the hose 34). Thus, the seeds 42 may drop from the air stream 38 due to gravity. The air stream 38 may then exit the hopper 44 via a screened opening 48. More specifically, the screened opening 48 may enable air to escape while dislodge any remaining seeds 42. In this manner, seeds 42 are delivered and stored in the hopper 44.

As described above, each tool meter 18 may control the volume of seeds 42 stored in the hopper 44. More specifically, as the amount of seeds 42 in the hopper 44 increases, the level of the seeds 42 within the hopper 44 may increase to block the screened opening 48. As the portion of the screened opening 48 that enables the air stream 38 to escape is reduced, the air pressure within the hopper 44 increases, which creates resistance against the air stream 38. As such, the flow rate of the air stream 38 into the hopper 44 may decrease, which decreases the amount of seeds being delivered to the tool meter 18.

In fact, the change in the air pressure within the hopper 44 may be proportional to the area of the screened opening 48 that is blocked. In other words, the amount of seeds 42 delivered to the hopper 44 may vary based on the amount of seeds 42 stored within the hopper 44. Additionally, when the screened opening 48 is completely or nearly completely blocked, the air stream 38 may stop flowing into the tool meter 18, and thus stop delivering seeds to the tool meter 18.

In this manner, the tool meter 18 may maintain a desired volume/amount of seeds 42 held in the hopper 44 (e.g., below a threshold level). In some embodiments, the desired amount may be adjustable by controlling the position and/or the size of the screened opening 48. For example, the screened opening 48 may be positioned higher to increase amount of seeds 42 in the hopper 44, or positioned lower to decrease the amount of seeds 42 held in the hopper 44 by a manufacturer. Additionally, the size of the screened opening 48 may be controlled by an operator (e.g., via an actuator).

Each tool meter 18 may then pneumatically distribute seeds 42 to multiple ground engaging opener assemblies 16 via hoses 22 as described with reference to FIG. 3. For example, in the depicted embodiment, the first tool meter 18A may distribute seeds to a first ground engaging opener assembly 16A via a first hose 22A, a second ground engaging opener assembly 16B via a second hose 22B, a third ground engaging opener assembly 16C via a third hose 22C, a fourth ground engaging opener assembly 16D via a fourth hose 22D, and a fifth ground engaging opener assembly 16E via a fifth hose 22E. Similarly, the second tool meter 18B may distribute seeds to eight different ground engaging opener assemblies 16, and the third tool meter 18C may distribute seeds to five different ground engaging opener assemblies 16.

As described above, since each ground engaging opener assembly 16 exerts little if any control over the seed flow rate after the seeds are received, the tool meters 18 may control the seed flow rate by controlling distribution of seeds to the ground engaging opener assembly 16. Additionally, since each tool meter 18 may distribute seeds to multiple ground engaging opener assemblies 16, each tool meter 18 may control the depositing of seeds 42 for multiple rows.

For example, in the depicted embodiment, the first tool meter 18A may control the deposition of seeds in a first row planted by the first ground engaging opener assembly 16A, in a second row planted by the second ground engaging opener assembly 16B, in a third row planted by the third ground engaging opener assembly 16C, in a fourth row planted by the fourth ground engaging opener assembly 16D, and in a fifth row planted by the fifth ground engaging opener assembly 16E. In other words, the first tool meter 18A may control the deposition of seeds across five rows. In fact, in some embodiments, the first tool meter 18A may individually control deposition of seeds across the five rows by individually controlling seed flow to the tool meters 16A-16E. Additionally, the second tool meter 18B may control the deposition of seeds across eight rows and the third tool meter 18C may control the deposition of seed across five rows.

Thus, the number of rows controlled by each tool meter 18 may vary even across the agricultural implement 10. For example, in the depicted embodiment, the second tool meter 18B may distribute seeds to a larger number of ground engaging opener assemblies 16 than the first tool meter 18A and the third tool meter 18C since the second tool meter 18B is located closer to the air tank 12 and may thus receive a larger portion of the seeds 42. Additionally, the second tool meter 18B may include a larger seed hopper 44 or utilize a screened opening 48 positioned higher to increase volume of seeds stored at the seed tool meter 18B.

Regardless of the number of rows controlled by the tool meter 18, each tool meter 18 may control distribution of seeds to the ground engaging opener assemblies 16 using the metering component 46 as described with reference to FIG. 4. As depicted, the metering component 46 includes a housing 50, an air source 52, multiple hose connectors 54, and a drive unit 56 (e.g., a motor). More specifically, each hose connector 54 may be coupled to a respective hose 22 to enable the seeds 42 to be output from the tool meter 18 and distributed to corresponding ground engaging opener assemblies 16. In the depicted embodiment, the metering component 46 may utilize an air stream generated by the air source 52 to pneumatically distribute seeds to the various ground engaging opener assemblies 16.

Figure 5:
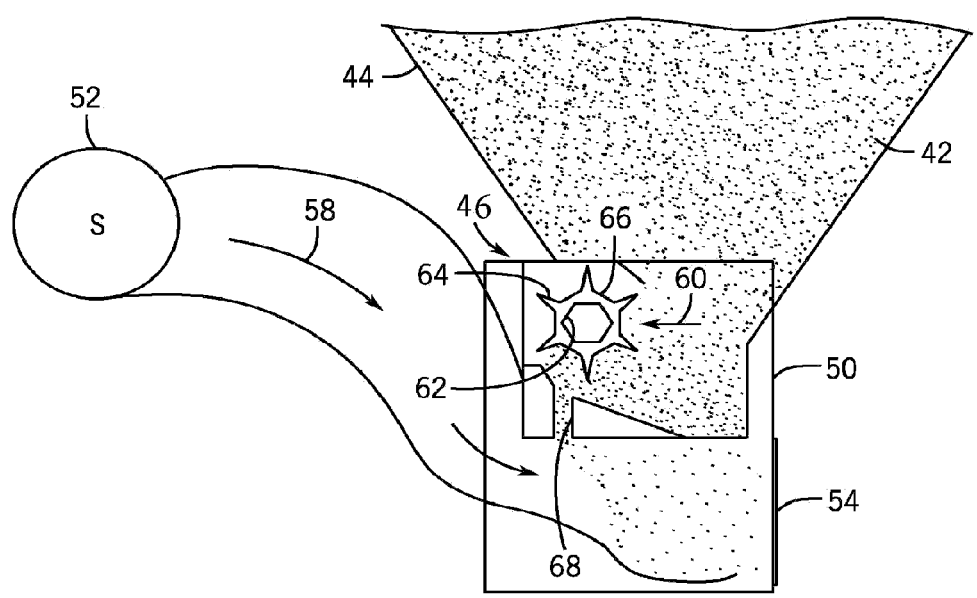
FIG. 5 is a schematic view of a portion of the tool meter of FIG. 4, in accordance with an embodiment.

As described above, the metering component 46 may control (e.g., meter) the flow of seeds 42 output through the hose connectors 54. In some embodiments, the metering component 46 may utilize the drive unit 56 to actuate meter rollers (not shown) within the housing 50 to meter the seed output. To help illustrate, a schematic view of the tool meter 18 is shown in FIG. 5. As depicted, the air source 52 generates an air stream 58 guided through the housing 50. In some embodiments, the air source 52 may be a pump or blower powered by an electric or hydraulic motor, for example. As depicted, the air stream 58 is guided so that it tangentially engages seeds 42 output from the hopper 44. In this manner, the seeds 42 may be entrained in the air stream 58 and output from the hose connectors 54.

Thus, the metering component 46 may control the flow rate of seeds 42 by controlling the flow of seeds from the hopper 44 into the air stream 58. In the depicted embodiment, a meter roller 60 may be utilized to control the flow of seeds 42. More specifically, rotation of the meter roller 60 may transfer seeds 42 through an opening 68 into the air stream 58.

Thus, as depicted, the meter roller 60 includes an interior cavity 62 that receives a shaft connected to the drive unit 56, which actuates the meter roller 60. In other embodiments, the meter rollers 60 may be coupled to a wheel 20 so that rotation of the wheel 20 drives the meter roller 60 to rotate. Such a configuration may automatically vary the rotation rate of the meter rollers 60 based on the speed of the agricultural implement 10.

Additionally, each meter roller 60 also includes multiple flutes 64 and recesses 66. More specifically, seeds 42 may be held between adjacent flutes 64 in the recess 64. Thus, as the meter roller 60 rotates, gravity may pull the seeds 42 held in a recess 66 through the opening 68 and into the air stream 58. Generally, the number and geometry of the flutes 64 may be based on the product 42 being distributed. For example, a meter roller 60 having deeper recesses 66 and fewer flutes 64 may be employed for larger seeds, while a meter roller 60 having shallower recesses 66 and more flutes 64 may be employed for smaller seeds. Other parameters such as flute pitch (i.e., rotation relative to a longitudinal axis) and flute angle (i.e., rotation relative to a radial axis) may also be varied in other embodiments.

Thus, the rotation rate of the meter roller 60 may control the flow of seeds 42 into the air stream 58, and thus, the distribution of seeds 42 to the ground engaging opener assemblies 16. In the depicted embodiment, the meter roller 60 may be a single continuous meter roller 44. In such an embodiment, the seed distribution to each of the ground engaging opener assemblies 16 supplied by the tool meter 18 may be generally uniform. In other embodiments, the metering component 46 may include multiple meter rollers 60 disposed adjacent to one another along a longitudinal axis of the rollers 60. For example, in such an embodiment, each individual meter roller 60 may be used to control seed output through a corresponding hose connector 54. Accordingly, the metering component 46 may include 4, 5, 6, 7, 8, 9, or more meter rollers 60.

In this manner, the tool meter 18 may independently control pneumatic distribution of seeds 42 to multiple ground engaging opener assemblies 16. More specifically, each tool meter 18 may be located in close proximity to the ground engaging opener assemblies 16 and may supply seeds 42 to only a portion of the ground engaging opener assemblies 16, which may more enhance control of seed distribution. For example, since each tool meter 18 is located in close proximity to the ground engaging opener assemblies 16 distribution rates may be quickly and accurately addressed. Additionally, since each tool meter 18 may supply seeds 42 to only a portion of the ground engaging opener assemblies 16, sectional control may be enabled. For example, one tool meter 18 may cease distributing seeds while another continues to distribute seeds. Furthermore, the tool meter 18 may vary seed distribution to each of the ground engaging opener assemblies 16 to enable individualized control over each of the ground engaging opener assemblies 16.

In other words, operational control over the agricultural implement 10 may be improved by pneumatically providing seeds to multiple tool meters 18 in an on-demand manner and then enabling each tool meters 18 to control pneumatic distribution of seeds to a portion of the ground engaging opener assemblies 16 on the agricultural implement 10. In some embodiments, one or more control units 70 may be used to enable the improved operational control as described in FIG. 3. More specifically, the one or more control units 70 may control operation of the pneumatic distribution system 33 and/or the tool meters 18. Accordingly, the control unit 70 may include one or more processing circuits 72 and memory 74. In some embodiments, the processing circuits 72 may include one or more field programmable gate arrays, one or more application specific integrated circuits, one or more general purpose processors, or any combination thereof. Additionally, the memory 74 may include one or more tangible, non-transitory, computer-readable mediums that store instructions executable by the processing circuits 72.

Figure 6:
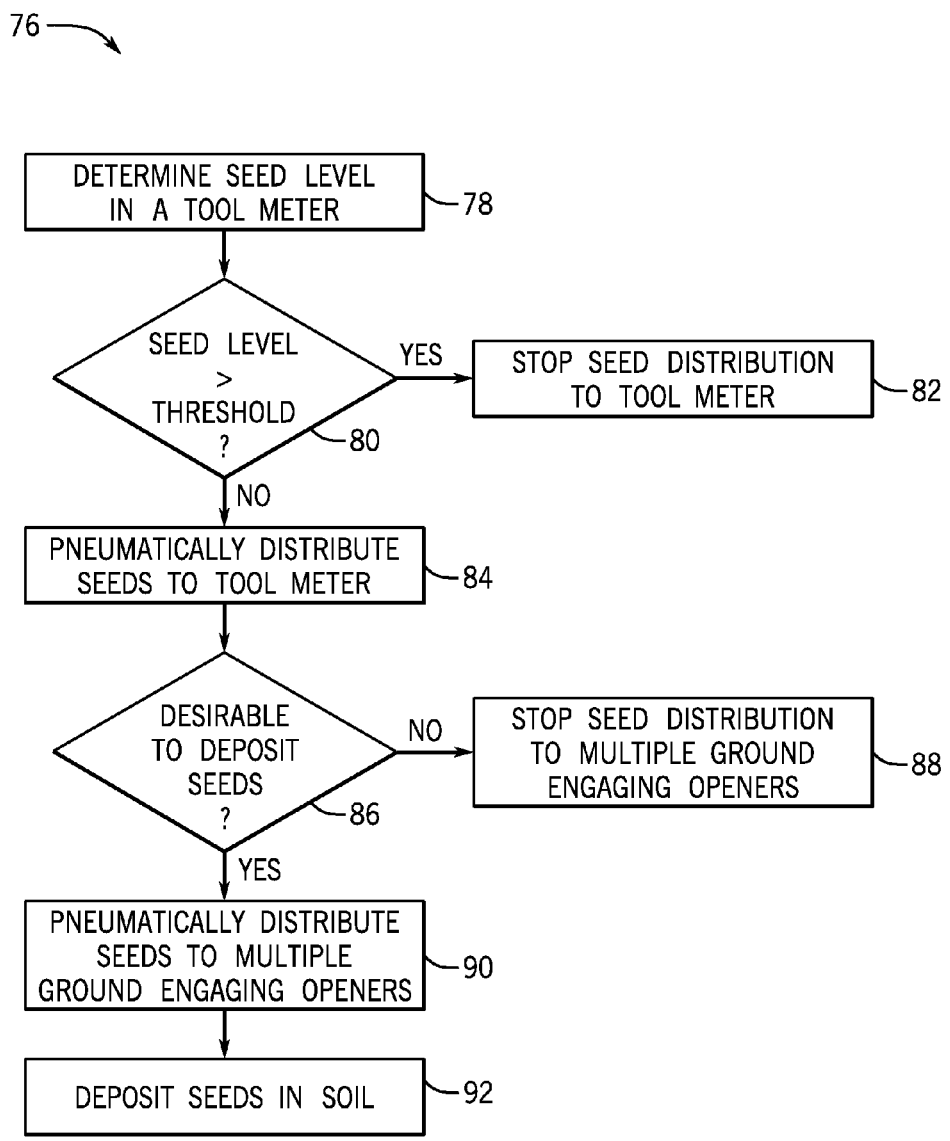
FIG. 6 is a flow diagram of a process for controlling seed distribution from the air cart to each ground engaging opener assembly, in accordance with an embodiment.

To help illustrate, one embodiment of a process 76 for controlling the operation of an agricultural system is shown in FIG. 6. Generally, the process 76 includes determining seed level in a tool meter (process block 78), determining whether the seed level is greater than a threshold level (decision block 80), and stopping seed distribution to the tool meter when the seed level is greater than the threshold level (process block 82). Additionally, the process 76 includes pneumatically distributing seeds to the tool meter when the seed level is not greater than the threshold level (process block 84), and determining whether it is desirable to deposit seeds from the ground engaging opener assemblies supplied by the tool meter (decision block 86). When not desirable, the process 76 includes stopping seed distribution to the ground engaging opener assemblies (process block 88). On the other hand, when desirable, the process 76 includes pneumatically distributing seeds to the ground engaging opener assemblies (process block 90) and depositing the seeds within the soil (process block 92). In some embodiments, all or portions of the process 76 may be implemented by instructions stored in memory 76 or another tangible, non-transitory, computer readable medium and executed by the processing circuit 72 or another processor.

Accordingly, a seed tool 18 may determine a desired seed level in its hopper 44 (process block 78). More specifically, the seed tool 18 may determine whether the seed level is below a threshold level (decision block 80). In some embodiments, the seed tool 18 may determine whether the seed level is greater than the threshold level using the screened opening 48. More specifically, the tool meter 18 may determine that the threshold level has been reached when the air pressure within the hopper 44 increases due to the screened opening 48 being blocked by seeds 42. In other embodiments, the seed tool 18 may utilize a sensor (e.g., a pressure sensor or a contact sensor) to determine the seed level in the hopper 44.

The control unit 70 may instruct the air source 32 to generate an air stream 38, which fluidizes and carries seeds from the storage tank 26. In some embodiments, since no metering is performed by the air cart 12, the air stream 38 may be generated regardless of the seed level in the tool meter 18. The tool meter 18 may control the amount of seeds delivered and stored in the hopper 44. More specifically, the tool meter 18 may control the amount of seeds 42 delivered to the hopper 44 by controlling the portion of the air stream 38 received.

For example, when the tool meter 18 determines that the seed level is greater than the threshold level, the tool meter 18 may instruct the pneumatic distribution system 33 to stop delivery of seeds to that tool meter 18 by blocking the air stream 38 to the hopper 44 (process block 82). More specifically, as the screened opening 48 is covered, the air pressure within the hopper 44 may increase, which creates resistance to the air stream 38. On the other hand, when the tool meter 18 determines that the seed level is not greater than the threshold level, the tool meter 18 may instruct the pneumatic distribution system 33 to continue pneumatically distributing seeds to the hopper 44 by enabling the air stream 38 to be delivered to the hopper 44 (process block 84). In other embodiment, the tool meter 18 may actively instruct the pneumatic distribution system 33 to control portion of the air stream 38 delivered to the tool meter.

Additionally, the control unit 70 may determine whether it is desirable to deposit seeds using ground engaging opener assemblies 16 supplied by the tool meter 18 (decision block 86). When not desirable, the control unit 70 may instruct the tool meter 18 to stop seed distribution to the ground engaging opener assemblies (process block 88). More specifically, the control unit 70 may instruct the tool meter 18 to stop rotation of the meter roller 60, which stops the flow of seeds into the air stream 58. Additionally or alternatively, the control unit 70 may instruct the air source 52 to stop generating the air stream 58.

On the other hand, when seed deposition is desirable, the control unit 70 may instruct the tool meter 18 to pneumatically distribute seeds to the ground engaging opener assemblies 16 (process block 90). More specifically, the control unit 70 may instruct the tool meter 18 to actuate the meter roller 60 at a specific speed to achieve a desired flow rate to the ground engaging opener assemblies. In fact, in embodiments where multiple meter rollers 60 are employed, the control unit 70 may instruct the tool meter 18 to actuate each of the meter rollers 60 at different speeds. Additionally, the control unit 70 may instruct the air source 52 to generate an air stream 58 with a desired magnitude to engage and carry seeds 42 from the hopper 44 to multiple ground engaging opener assemblies 16 via hoses 22.

Once the seeds 42 are received, the ground engaging opener assemblies 16 may deposit the seeds 42 into the soil (process block 92). More specifically, the ground engaging opener assemblies 16 may utilize the opener 17 to form a trench in the soil as the agricultural implement 10 is towed through the field. The seeds may then be output from the hose 22, though the seed tube 21, and into the trench. The press wheel 19 may then move the excavated soil into the trench to cover the seeds 42.

As described, the process 76 may be performed with respect to each tool meter 18. For example, in the above described embodiments, the first tool meter 18A, the second tool meter 18B, and the third tool meter 18C may each control the flow rate of seeds delivered to and stored in respective hoppers 44 in an on-demand manner. Additionally, the three tool meters 18A, 18B, and 18C may each determine whether to distribute seeds 42 to the respective ground engaging opener assemblies 16, which enables sectional control across the agricultural implement 10.

Accordingly, embodiments described herein may provide the technical benefit of improving control over operation of an agricultural implement. More specifically, the agricultural implement may include multiple tool meters that are supplied with product from a centralized storage tank in an on-demand manner. Additionally, each tool meter may then control distribution of the product to multiple ground engaging opener assemblies, which control the deposition of the product into the soil. In some embodiments, the use a tool meter on the agricultural implement may account for operational variations since the tool meter may be located in close proximity to the ground engaging opener assemblies and supply product to only a portion of the ground engaging opener assemblies. Additionally, in some embodiments, the use of multiple tool meters may enable sectional control across the agricultural implement by enabling one or more tool meters to be disabled while others are enabled.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
   a plurality of ground engaging opener assemblies each configured to excavate a trench into soil and to deposit a granular product into the trench as the agricultural implement is towed though a field;
   a first tool meter coupled to a tool frame of the agricultural implement and pneumatically coupled to a first number of ground engaging opener assemblies of the plurality of ground engaging opener assemblies, wherein the first tool meter is configured to:
      instruct a pneumatic distribution system to supply the granular product to the first tool meter based at least in part on a first amount of the granular product stored in the first tool meter; and
      pneumatically distribute the granular product to the first number of ground engaging opener assemblies; and
   a second tool meter coupled to the tool frame and pneumatically coupled to a second number of ground engaging opener assemblies of the plurality of ground engaging opener assemblies, wherein the second number of ground engaging opener assemblies is different from the first number of ground engaging opener assemblies, and the second tool meter is configured to:
      instruct the pneumatic distribution system to supply the granular product to the second tool meter based at least in part on a second amount of the granular product stored in the second tool meter; and
      pneumatically distribute the granular product to the second number of ground engaging opener assemblies.

2. The agricultural implement of claim 1, wherein:
   the first tool meter comprises a first opening assembly, wherein the first opening assembly comprises a first screened opening configured to enable a first air stream carrying the granular product from the pneumatic distribution system to the first tool meter at a first rate to exit the first tool meter; and
   the second tool meter comprises a second opening assembly, wherein the second opening assembly comprises a second screened opening configured to enable a second air stream carrying the granular product from the pneumatic distribution system to the second tool meter at a second rate to exit the second tool meter;
   wherein the second rate and the first rate are different from one another to enable the first tool meter to supply the granular product to the first number of ground engaging opener assemblies and the second tool meter to supply the granular product to the second number of ground engaging opener assemblies.

3. The agricultural implement of claim 1, wherein the granular product comprises seeds, dry fertilizer, or a mixture thereof.

4. The agricultural implement of claim 1, wherein:
   the first number of ground engaging opener assemblies is greater than the second number of ground engaging opener assemblies; and
   distribution of the granular product from the pneumatic distribution system is biased toward the first tool meter compared to the second tool.

\* \* \* \* \*